(12) United States Patent
Kim et al.

(10) Patent No.: US 9,965,049 B2
(45) Date of Patent: May 8, 2018

(54) DISPLAY APPARATUS AND CONTROLLING METHOD THEREOF

(71) Applicant: SAMSUNG ELECTRONICS CO., LTD., Suwon-si (KR)

(72) Inventors: Soo-jung Kim, Hanam-si (KR); Sang-hyun Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 306 days.

(21) Appl. No.: 14/618,617

(22) Filed: Feb. 10, 2015

(65) Prior Publication Data

US 2015/0338928 A1    Nov. 26, 2015

(30) Foreign Application Priority Data

May 26, 2014    (KR) .................. 10-2014-0062823

(51) Int. Cl.
| | |
|---|---|
| *G06F 3/033* | (2013.01) |
| *G06F 3/0488* | (2013.01) |
| *G06F 3/0481* | (2013.01) |
| *G06F 3/038* | (2013.01) |
| *G06F 3/01* | (2006.01) |
| *G06F 3/0354* | (2013.01) |

(52) U.S. Cl.
CPC .............. *G06F 3/033* (2013.01); *G06F 3/016* (2013.01); *G06F 3/038* (2013.01); *G06F 3/03545* (2013.01); *G06F 3/0481* (2013.01); *G06F 3/0488* (2013.01)

(58) Field of Classification Search
CPC ......... G06F 3/033; G06F 3/0488; G06F 3/038
See application file for complete search history.

(56) References Cited

U.S. PATENT DOCUMENTS

| | | | | |
|---|---|---|---|---|
| 8,988,763 | B2 * | 3/2015 | Keam | G02F 1/167 |
| | | | | 345/107 |
| 2006/0156252 | A1 * | 7/2006 | Sheshagiri | H04L 12/2803 |
| | | | | 715/825 |
| 2008/0174568 | A1 * | 7/2008 | Kim | G06F 3/04886 |
| | | | | 345/173 |
| 2010/0231550 | A1 * | 9/2010 | Cruz-Hernandez | G06F 3/016 |
| | | | | 345/174 |
| 2011/0157079 | A1 * | 6/2011 | Wu | G06F 3/044 |
| | | | | 345/174 |
| 2011/0273376 | A1 | 11/2011 | Dickinson et al. | |
| 2013/0181913 | A1 | 7/2013 | Cole et al. | |
| 2013/0194242 | A1 | 8/2013 | Park et al. | |
| 2014/0019905 | A1 * | 1/2014 | Kim | G06F 3/0481 |
| | | | | 715/780 |
| 2014/0043242 | A1 * | 2/2014 | Dietz | G06F 3/016 |
| | | | | 345/173 |
| 2014/0055427 | A1 * | 2/2014 | Kim | G06F 3/03545 |
| | | | | 345/179 |
| 2014/0118312 | A1 * | 5/2014 | Oyama | G06F 3/038 |
| | | | | 345/179 |

(Continued)

*Primary Examiner* — David Choi
(74) *Attorney, Agent, or Firm* — Sughrue Mion, PLLC

(57) ABSTRACT

A display apparatus is provided. The apparatus includes: a user interface configured to adjust a friction force between the user interface and a pen; and a controller configured to, in response to a pen being touched and moved on the user interface, control the user interface to adjust the friction force based on an input mode of the pen.

20 Claims, 11 Drawing Sheets

(56) References Cited

U.S. PATENT DOCUMENTS

| | | | |
|---|---|---|---|
| 2014/0253478 A1* | 9/2014 | Jeong | G06F 3/016 345/173 |
| 2014/0372902 A1* | 12/2014 | Bryant | G06F 17/30029 715/748 |
| 2014/0372905 A1* | 12/2014 | Bryant | H04M 1/72566 715/753 |
| 2015/0106919 A1* | 4/2015 | Liang | G06F 3/04883 726/19 |
| 2015/0227253 A1* | 8/2015 | Williams | G06F 3/0416 345/173 |
| 2015/0249865 A1* | 9/2015 | Oliveira | H04N 21/44213 725/14 |
| 2015/0338928 A1* | 11/2015 | Kim | G06F 3/033 715/765 |

* cited by examiner

DISPLAY APPARATUS AND CONTROLLING METHOD THEREOF

CROSS-REFERENCE TO RELATED APPLICATION(S)

This application claims priority from Korean Patent Application No. 10-2014-0062823, filed in the Korean Intellectual Property Office on May 26, 2014, the disclosure of which is incorporated herein by reference in its entirety.

BACKGROUND

1. Field

Apparatuses and methods consistent with exemplary embodiments relate to a display apparatus and a controlling method thereof, and more particularly, to a display apparatus which provides a feeling of handwriting which mimics the real feeling of handwriting through an electronic notepad method using a pen, and a controlling method thereof.

2. Description of Related Art

With the development of electronic technologies, various types of portable terminal apparatuses are being developed and disseminated. In particular, recently, as smart phones, which provide far more kinds of applications compared to the conventional cellular phones, gain popularity, smart phones have been provided at an exponential speed.

A user can use various types of services using a terminal apparatus such as a smart phone. For example, the user can use services such as note-taking or text editing. In the process of using such services, the user may input text with a hand directly, or take notes or sketches using a pen through a touch panel of a smart phone. With the development of electronic technologies, such methods have become more accurate and more elaborate.

Thus, a user's expectation of both the accuracy of input and an experience of a feeling of handwriting close to the real feeling of handwriting on actual paper with an actual pencil when writing with a pen is on the rise. In the related art, various methods, such as improving a grip of a pen, have been tried to provide the feeling of handwriting close to the real feeling of handwriting on actual paper.

However, the these methods are not enough to provide a user with the feeling of handwriting similar to the real feeling of handwriting. Accordingly, there is a demand for an environment where a user can write or sketch naturally on a portable apparatus.

SUMMARY

Exemplary embodiments address the above disadvantages and other disadvantages not described above. Also, an exemplary embodiment is not required to overcome the disadvantages described above, and an exemplary embodiment may not overcome any of the problems described above.

One or more exemplary embodiments relate to a display apparatus which provides a feeling of handwriting which mimics the real feeling of handwriting through an electronic notepad method using a pen, and a controlling method thereof.

Accordingly to an aspect of an exemplary embodiment, there is provided a display apparatus including: a user interface configured to adjust a friction force between the user interface and a pen; and a controller configured to, in response to the pen being touched and moved on the user interface, control the user interface to adjust the friction force based on an input mode of the pen.

In response to the pen being touched and moved on the user interface while a notepad is displayed on the user interface, the controller may be further configured to control the user interface to display a trajectory of the pen on the notepad.

The notepad may include one of a plurality of background images, wherein the controller may be further configured to control the user interface to adjust the friction force based on a currently displayed background image of the plurality of background images and the input mode of the pen.

In response to an input mode of the pen being selected, the controller may be further configured to control the user interface to display a background image that corresponds to the selected input mode among the plurality of background images.

The controller may be further configured to apply a background image selected from a plurality of background images to the notepad, and change the input mode of the pen to an input mode corresponding to the selected background image.

The controller may be further configured to control the user interface to display a recommendation list which recommends at least one background image that corresponds to the input mode of the pen among the plurality of background images.

The pen may operate in one of a plurality of input modes, wherein the controller may be further configured to control the user interface to display a recommendation list which recommends at least one of the plurality of input modes according to a background image of the notepad.

In response to the at least one background image including at least two background images, the controller may be further configured to generate the recommendation list by arranging the at least two background images in a descending order of frequency of selection with respect to the input mode of the pen.

The display apparatus may further include a storage configured to store a first friction index value set based on the input mode of the pen, a second friction index value set based on a background image of the notepad, and information for matching the input mode and the background image, respectively.

In response to a new input mode of the pen being generated, the controller may be further configured to determine an input mode which most closely matches the new input mode by calculating proximities between a friction index value of the new input mode and friction index values pre-stored in the storage, and control the user interface to display a background image matched with the determined input mode by applying the background image to the notepad.

According to an aspect of another exemplary embodiment, there is provided a method of controlling a display apparatus, including: determining an input mode of a pen; and changing a friction force between the pen and a display surface of the display apparatus to correspond to the input mode of the pen.

The method may further include: displaying a notepad which includes one of a plurality of background images; and in response to the pen being touched and moved on the display surface displaying notepad, displaying a trajectory of the pen on the notepad, wherein the friction force may be a friction force corresponding to a currently displayed background image of the plurality of background images and the input mode of the pen.

The method may further include: displaying a user interface (UI) for receiving a selection of an input mode of the pen; and in response to the input mode being selected in the UI, selecting a background image corresponding to the selected input mode from the plurality of background images, wherein the displaying the notepad includes displaying the selected background image by applying the selected background image to the notepad.

The method may further include: displaying a user interface (UI) for receiving a selection of one of the plurality of background images; and in response to a background image being selected from the UI, changing the input mode of the pen to an input mode corresponding to the selected background image.

The method may further include displaying a recommendation list which recommends at least one background image that corresponds to the input mode of the pen among the plurality of background images.

The method may further include displaying a recommendation list which recommends at least one input mode among a plurality of input modes which are supported by the pen according to a background image of the notepad.

In response to the at least one background image including at least two background images, the recommendation list may be a list where the at least two background images are arranged in a descending order of frequency of selection with respect to the input mode of the pen.

The method may further include: in response to a new input mode of the pen being generated, detecting an input mode which has a friction index value which is closest to a friction index value of the new input mode among the existing input modes; and by applying a background image corresponding to the detected input mode to the notepad, displaying the background image corresponding to the detected input mode.

According to an aspect of another exemplary embodiment, there is provided a non-transitory computer readable medium having recorded thereon a program, which when executed by a computer, causes the computer to execute a method of controlling a display apparatus, the method including: determining an input mode of a pen; and changing a friction force between the pen and a display surface of the display apparatus to correspond to the input mode of the pen.

According to an aspect of another exemplary embodiment, there is provided a display apparatus including: a touchscreen configured to display an image; and a controller configured to adjust a property of the display apparatus such that a coefficient of friction between the touchscreen and a stylus touching the touchscreen is changed to correspond to the displayed image.

The controller may be further configured to adjust the property of the display apparatus such that the coefficient of friction is changed to correspond to both of the displayed image and a selected input mode of the stylus.

The displayed image may be an image of one of a plurality physical writing surfaces, and wherein the coefficient of friction may be changed based on the displayed image such that a user writing on the touchscreen with the stylus is provided with a feeling that mimics a feeling of writing on the physical writing surface corresponding to the displayed image.

The property of the display apparatus may be a roughness of the touchscreen.

According to the above-described various exemplary embodiments, a user may feel like they are writing on actual paper when writing on a display apparatus using a pen. Therefore, the user may experience an improved feeling of handwriting.

BRIEF DESCRIPTION OF THE DRAWINGS

The above and/or other exemplary aspects and advantages will be more apparent by describing certain exemplary embodiments with reference to the accompanying drawings, in which.

DETAILED DESCRIPTION OF EXEMPLARY EMBODIMENTS

Figure 1:
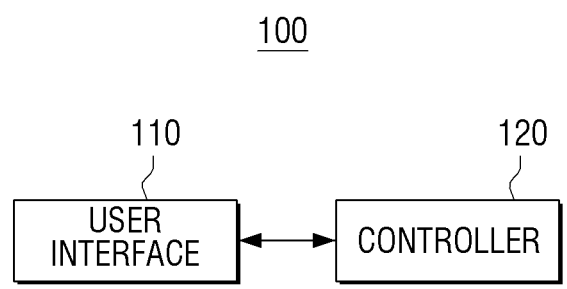
FIG. 1 is a block diagram illustrating a configuration of a display apparatus according to an exemplary embodiment.

Hereinafter, certain exemplary embodiments will be described in detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram illustrating a configuration of a display apparatus according to an exemplary embodiment. A display apparatus 100 of FIG. 1 may be embodied as various types of portable terminal apparatuses such as a cellular phone, a personal digital assistant (PDA), a laptop, a tablet personal computer (PC), an electronic frame, an electronic book, an MP3 player, etc., as well as a terminal apparatus such as a television (TV) or a PC. As discussed herein, the display apparatus 100 may comprise one or more processing devices, for example, a central processing unit (CPU) or other processor.

According to FIG. 1, the display apparatus 100 includes a user interface 110 and a controller 120.

The user interface 110 is an element which may receive a user input. For example, the user interface 110 may be a touch screen including a display panel and a detection sensor. A controller 120 may control the display panel to display various types of screens. The detecting sensor may detect a user manipulation on the display panel. The user manipulation may be performed through various types of input means such as a finger of the user or a pen (e.g., a stylus). The detecting sensor, disposed on a lower side of the display panel, may detect a point on the display panel where an input means touches. The controller 120 may receive a result of the detection and may perform a controlling operation corresponding to the result.

A property of the user interface 110 may be adjusted such that a friction force between the input means and the display surface of the user interface 110 may be adjusted differently.

For convenience of description, the friction force between the input means and the display surface of the user interface 110 will be referred to as a surface friction force. Accordingly, in response to a user touching the user interface 110 using an input means, and inputting a touch-and-drag or a touch-and-flick manipulation which moves a touched point, the user may have feel different textures according to a degree of a surface friction force. For example, in response to a large surface friction force, the display surface may feel rough to the user and in response to a small surface friction force, the display surface may feel smooth to the user.

The user interface 110 may adjust a surface friction force according to a control of the controller 120. A method of adjusting the surface friction force may be embodied in various ways according to various exemplary embodiments. For example, in response to a pen being touched on the user interface 110, a surface friction force may be adjusted as an electromagnetic force applied to the pen changes. That is to say, although the roughness of the display surface may remain unchanged, a moving resistance between the pen and the display surface may be changed. In addition, the user interface 110 may be coated with a thin polymer layer which reacts to an electric current or voltage, and as a volume of the polymer expands or contracts according to the electric current or the voltage, a surface of the coating layer may become uneven. Put another way, the roughness of the display surface may be changed such that the coefficient of friction between the pen and the display surface is changed. By such method, the surface friction force of the user interface 110 may be adjusted.

The user interface 110 may be embodied as a touch screen, and includes a detection unit which detects not only a touch of a pen but also a touch of a finger through an electrostatic method or a decompression method. The detection unit, in response to a finger of a user or a pen touching an object displayed on a screen, detects the touched point and informs the controller 120 of the touched point.

For example, the detection unit may include a pen recognition panel and a touch panel. The pen recognition panel detects an adjacent input of a pen or a touch input, and outputs an event signal according to a result of the detection. Such pen recognition panel may be embodied in an electro magnetic resonance (EMR) method, and may detect a touch or an adjacent input according to a change of an intensity of an electromagnetic field by proximity or a touch of the pen. Specifically, the pen recognition panel may include an electromagnetic coil sensor and an electronic signal processing circuit unit. The electromagnetic coil sensor is formed in a grid structure in which a plurality of loop coils intersect with each other. The electronic signal processing circuit unit provides an alternating signal in serial order for each of the loop coils of the electromagnetic coil sensor, and delivers a signal outputted from each of the loop coils to the controller 120.

The pen refers to an input apparatus which may be used to interact with the user interface 110. For example, a user may use the pen to write text or sketch a line or a figure on the user interface 110. The pen may also be referred to as a stylus pen or a PDA pen.

In response to a pen being equipped with a built-in resonant circuit, and in response to the pen being in a location close to a loop coil of a pen recognition panel, a magnetic field received from the corresponding loop coil generates an electric current in the resonant circuit within the pen based on mutual electromagnetic inductions. Based on the electric current, an induction magnetic field is generated from the coil constituting the resonant circuit of the pen, and the pen recognition panel detects the induction magnetic field from the loop coil which is in a signal reception state, and then a point where a pen access or a point of a touch is detected. Hereinabove, an input means is described as a pen, but any object which is able to generate an electric current based on an electromagnetic induction may be used as an input means.

A touch panel is an element to sense a physical touch input through a body of a user or other objects. For example, the touch panel may be in a form of a touch film, a touch sheet, a touch pad, etc. In response to the touch panel sensing a touch, a touch event value corresponding to the detected point is outputted.

The touch panel may include various forms of touch sensors such as a capacitive touch sensor or a decompressive touch sensor as described above. For example, in response to the touch panel being embodied as a capacitive touch panel, the touch panel may be constructed such that both surfaces of the glass are coated with a thin metallic conducting material (e.g., an indium tin oxide (ITO) layer) to allow an electric current flow on the surfaces of the glass and coated with a dielectric substance to store electric charges. In response to the surface of the touch panel being touched, a certain amount of an electric charge moves to the touched point by static electricity, and the touch panel recognizes a variation of the electric current according to the movement of the electric charge, detects a point where a touch is input, and tracks the touch event.

In addition, the user interface 110 displays various screens to provide a function of the display apparatus 100. For example, an icon corresponding to pre-installed various application programs or a menu icon prepared for using the apparatus may be displayed on a stand-by screen. In response to a particular application or a menu being selected on the stand-by screen, a screen corresponding to the selected application or the menu is displayed. For example, the user interface 110 may display a notepad by executing a notepad application. The notepad includes one of a plurality of background images and a trajectory of a pen may be displayed on the notepad.

The controller 120 is configured to control an overall operation of the display apparatus 100. For example, in response to an electronic pen being touched and moved on the user interface, the controller 120 may control the user interface 110 to set a surface friction force according to an input mode of the electronic pen.

The pen may operate in one of a plurality of input modes and the input mode may be embodied in various ways. For example, the input mode of the pen may be an input mode corresponding to different writing materials. Specifically, the input modes of the pen may include various modes such as a pencil mode, a brush mode, a fountain pen mode, a crayon mode, an eraser mode, etc. For convenience in description, an input state of a pen, a type of a nib, and a type of a pen will be described. However, the exemplary embodiments are not limited thereto.

In response to the pen being touched and moved on the user interface 110, the controller 120 may control the user interface 110 to set a surface friction force according to an input mode of the pen. For example, the display apparatus 100 may generate an electric field in one area of the user interface 110. The pen moving within the electric field area may receive an electromagnetic force in a direction that is opposite to a direction of the movement. Accordingly, the feeling of friction by the electromagnetic force may be delivered to the user through the pen, and the user may experience a feeling of handwriting which mimics the real feeling of handwriting. Put another way, the user may feel as if he or she is writing on an actual piece of paper.

According to another exemplary embodiment, the controller 120 may generate an electromagnetic force in a vertical direction with respect to a movement direction of a pen by adjusting an electromagnetic field area and a direction of a electric current flow of the pen. Thus, in response to an intensity of the electromagnetic force in a vertical direction being adjusted, the pen may be led to a vertical direction with respect to the direction of the movement of the pen as the user intends, or may be led to a direction which slightly strays from the intended movement direction. Through such method, the user may feel as if he or she is writing letters on an uneven surface such as a wood or brick with an actual pencil.

According to still another exemplary embodiment, the user interface 110 may be coated with a polymer which reacts to an electric current or voltage. The controller 120 may make an actual surface of the interface unit 110 uneven since the controller 120 may change a shape of the polymer by adjusting the electric current or the voltage. As a method of changing a shape of the polymer by adjusting the electric current or the voltage is known by those skilled in the art, a detailed description will not be provided herein.

Thus, an operation of the controller 120 which adjusts a surface friction force of the user interface 110 may be executed by combining the above-described methods in various ways. In other words, a polymer method may be used in a particular area of the user interface 110, while an electromagnetic force method may be used in the remaining areas. Similarly, the vertically-oriented electromagnetic force and the horizontally-oriented electromagnetic force may be applied respectively in areas separated from each other. Accordingly, the user may be provided with the experience of feeling as if he or she is writing on various types of surfaces.

Figure 2:
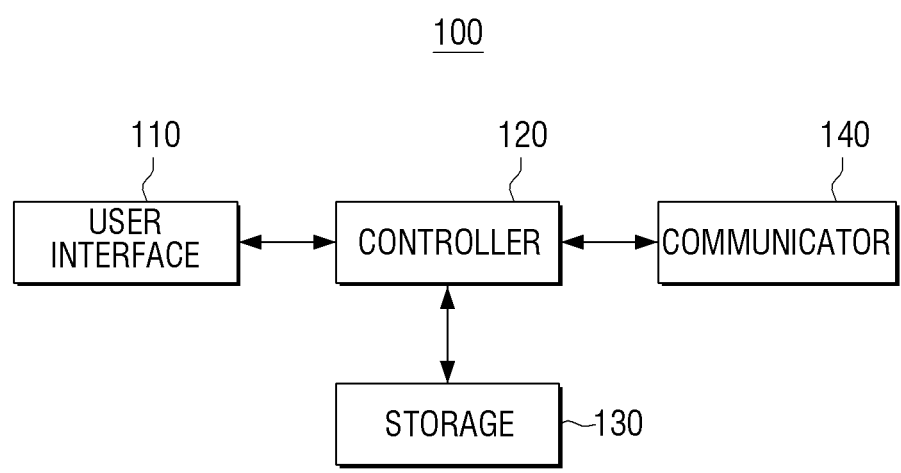
FIG. 2 is a block diagram illustrating an example of a detailed configuration of a display apparatus according to an exemplary embodiment.

FIG. 2 is a block diagram illustrating an exemplary embodiment of a detailed configuration of a display apparatus. According to FIG. 2, the display apparatus 100 includes the user interface 110, the controller 120, a storage 130, and a communicator 140.

The operation of the user interface 110 and the operation of the controller 120 have already been described with reference to FIG. 1, and thus, will not be described again in detail.

The storage 130 stores various types of programs and data necessary for operating the display apparatus 100. In addition, the storage 130 may also store data newly input, set, or generated in the process of executing an application program.

In particular, the storage 130 may store a first friction index value set by input mode of a pen and a second friction index value set by background image of a notepad.

For example, in response to an input mode of a pen being a pencil mode, the first friction index value may be set as 1, in response to a fountain pen mode, the first friction index value may be set as 2, in response to a crayon mode, the first index value may be set as 3, in response to a brush mode, the first index value may be set as 4, and in response to an eraser mode, the first index value may be set as 5. Such numerical values are merely exemplary, and may be set relatively according to characteristics of the writing materials corresponding to each mode. That is to say, because the friction generated between an eraser and paper is greater than the friction generated between the above other input modes and paper, the value of an eraser mode is set as the largest value, 5. In addition to the above-described input modes of a pen, various types of other modes are possible, and depending on an exemplary embodiment, the display apparatus 100 may download an input mode of a new pen from an external apparatus and stores it in the storage 130.

In addition, the second friction index value may be set based on a displayed or selected background image of a notepad, and for example, in response to a letter paper background image being displayed or selected, the second friction index value may be set as 1, in response to a rice paper background image being displayed or selected, the second friction index value may be set as 2, in response to a fabric background image being displayed or selected, the second friction index value may be set as 3, and in response to a brick background image being displayed or selected, the second friction index value may be set as 4. Similarly, such numerical values are merely set arbitrarily according to texture of each of the background images for convenience in description. In addition to the above-described background images of a notepad, various other types of background images may be used, and depending on an exemplary embodiment, the display apparatus 100 may download a background image of a new notepad from an external apparatus and stores it in the storage 130.

As described above, the set friction or the second friction index values are intrinsic values which may be used for the controller 120 to recognize an input mode of a pen or a background image of a notepad. That is, the controller 120, using the intrinsic values, may control the user interface 110 to have a surface friction force corresponding to a background image of a notepad or an input mode of a pen. For example, in response to the controller 120 recognizing the pencil mode (first friction index 1) and the letter paper background image (second friction index 1), the controller 120 controls a user interface to have a friction force of friction level 2. In addition, in response to the controller 120 recognizing the eraser mode (first friction index 5) and the brick background image (second friction index 4), the controller 120 controls the user interface to have a friction force of friction level 9.

In addition, the storage 130 may store information on matching an input mode of a pen and a background image respectively. Such matching information, which is information set arbitrarily based on a combination of a writing material and a notepad in a real life, may be predetermined or may be changed by the user. For example, matching information may be constituted by matching first friction index 1 for the pencil mode with second friction index 1 for the letter paper background mode, matching friction index 4 for a brush mode with second friction index 2 for a rice paper background mode, and by matching first friction index 3 for a crayon mode with second friction index 4 for the brick background image.

In response to a particular input mode of a pen being selected, using the matching information, the controller 120 may control the user interface 110 to display a notepad in which a background image corresponding to the selected input mode of a pen is applied. For example, referring to FIG. 6, in response to the input mode of a pen being selected to be the crayon mode, a notepad in which the brick background image is applied may be displayed automatically on the user interface 110.

The controller 120 may apply the background image selected from the plurality of background images to a notepad, and may change an input mode of a pen to an input mode corresponding to the selected background image automatically. For example, in response to the brick background image being selected, an input mode of a pen may be changed to the crayon mode.

According to still another exemplary embodiment, the storage 130 may store a recommendation list of notepad background images classified by an input mode of a pen. In addition, the storage 130 may store a recommendation list of an input mode of a pen classified by notepad background image. In response to a particular input mode of a pen being detected, the controller 120 may display a recommendation list of background images corresponding to the detected input mode of the pen.

The controller 120 may control the user interface 110 to display a recommendation list which recommends at least one background image corresponding to an input mode of a pen among a plurality of background images. For example, the controller 120 may generate a recommendation list by arranging at least one background image in a descending order of frequency of selection with respect to an input mode of a pen.

On the contrary, the controller 120 may also control the user interface 110 to generate a recommendation list of an input mode of a pen according to a background image selected from a plurality of background images, and to display the generated recommendation list. For example, the controller 120 may generate a recommendation list by listing at least one input mode of a pen in a descending order of the frequency of which each input mode of the pen is selected with respect to a background image.

The communicator 140 is configured to communicate with various types of external apparatuses according to various types of communication modes. The communicator 140 may include various communication chips such as a WiFi chip, a Bluetooth chip, a near field communication (NFC) chip, a wireless communication chip, etc. Through the communicator 140, communicating with a pen may be performed, and a new input mode of a pen or a new notepad background image may be downloaded from an external apparatus. Accordingly, the user may use a new pen type or a notepad background image which were not stored previously.

According to an exemplary embodiment, in response to a new input mode of a pen being generated, the controller 120 may control the user interface 110 to detect an input mode which has maximum proximity by calculating proximity between a friction index value of the new input mode and friction index values pre-stored in the storage, and display a background image matched with the detected input mode by applying the background image to the notepad.

For example, in response to a mechanical pencil mode (friction index value 1.2) which is a new input mode of a pen being recognized, the controller 120 calculates proximity. Then, a letter paper background image which is matched with a pencil (first friction value 1) having the closest friction index value to the mechanical pencil mode is recommended to the user. According to the method, even in response to a new input mode of a pen being selected, an appropriate background image may be recommended to the user using the existing matching information. Since the above method is also applied in response to a new notepad background image being recognized, a description of a new notepad background image will be omitted.

Hereinafter, an operation of a display apparatus according to various exemplary embodiments will be explained with reference to FIGS. 3 to 10.

Figure 3:
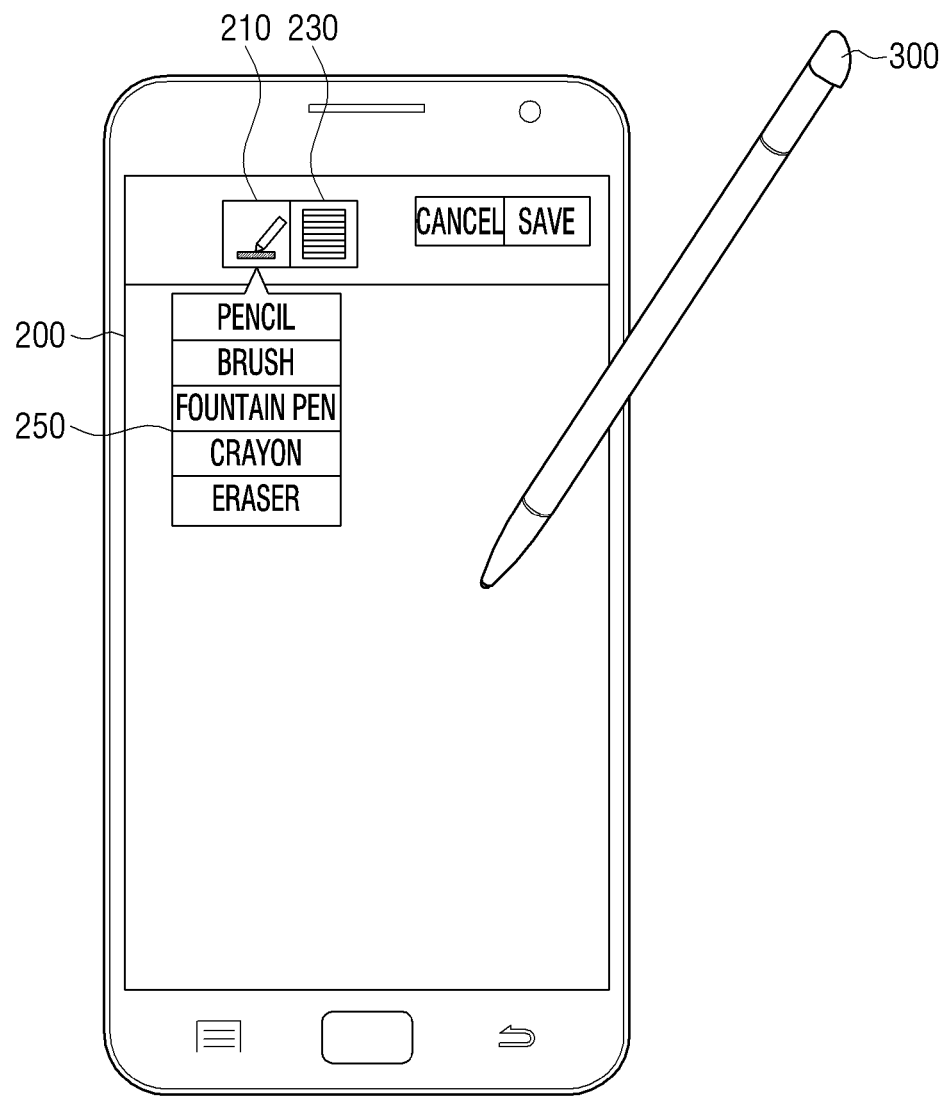
FIGS. 3 to 10 are views illustrating a configuration of a screen of a display apparatus according to various exemplary embodiments.
Figure 4:
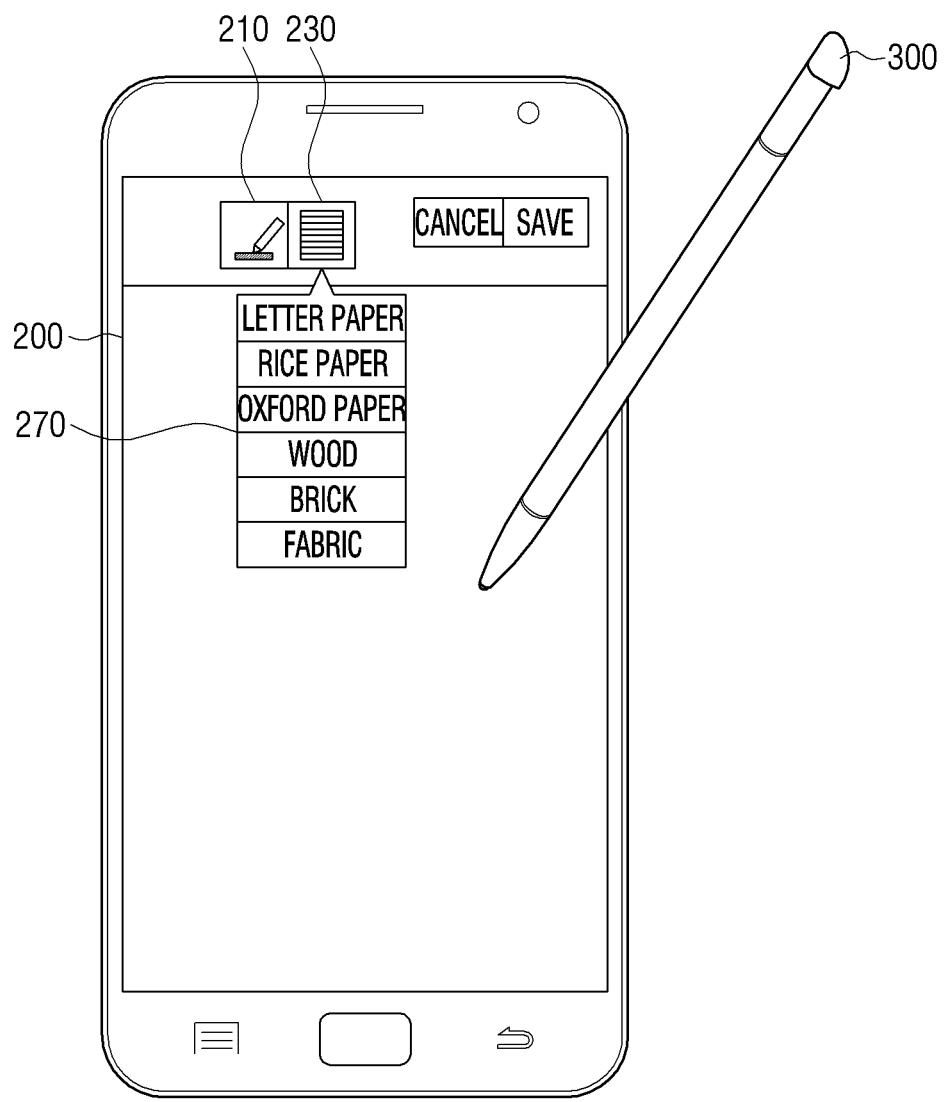
Figure 5:
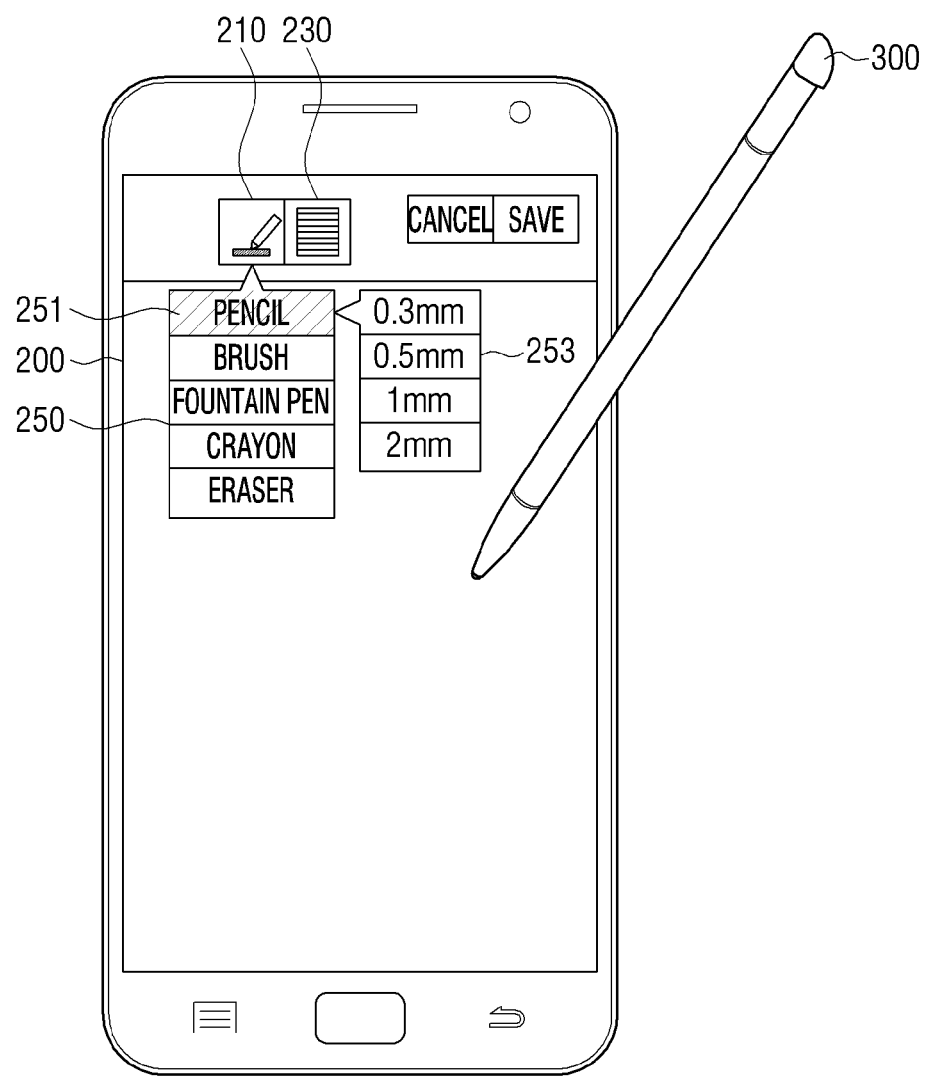

FIGS. 3 to 5 are views illustrating a configuration of a screen of a display apparatus according to various exemplary embodiments.

According to FIG. 3, a pen button 210 and a notepad background button 230 are displayed on a notepad window screen 200. In response to the pen button 210 being selected on the notepad window screen 200, a window 250 to receive a selection of a pen type is displayed. A user may select one among a pencil, a brush, a fountain pen, a crayon, and an eraser, and then may write or sketch on the notepad window screen 200 using a pen 300. The controller 120 may adjust a surface friction force of the user interface 110 which contacts with the pen 300 according to a selected input mode of a pen. For example, when the user selects and manipulates an eraser, the user may feel more friction than the friction the user may feel when selecting a pencil.

According to FIG. 4, the pen button 210 and the notepad background button 230 are displayed on the notepad window screen 200. In response to the notepad background button 210 being selected on the notepad window screen 200, a window 270 to receive a selection of a notepad background image type is displayed. The user may select one among letter paper, rice paper, Oxford paper, a wood, a brick, and fabric, and may write or sketch on the notepad window screen 200 using the pen 300. The controller 120 may adjust a surface friction force of the user interface 110 which contacts with the pen 300 according to a selected input mode of a pen and a selected notepad background image. For example, when the user selects and manipulates the letter paper and the eraser, the user may feel more friction than the friction the user may feel when selecting the wood and the eraser.

FIG. 5 is a view illustrating changing thickness of a pen input according to an exemplary embodiment. In response to a user selecting a pencil, a pencil area is marked with a selection mark 251, and a sub menu window 253 for the pencil is displayed. The user may select thickness of the pencil in the sub menu window 253. The user in response to 2 mm being selected may feel more friction than the friction the user may feel in response to 0.3 mm being selected through the pen 300. According to the exemplary embodiment, the user may experience a degree of friction set differently according to not only a pen type but also thickness of a nib.

Figure 6:
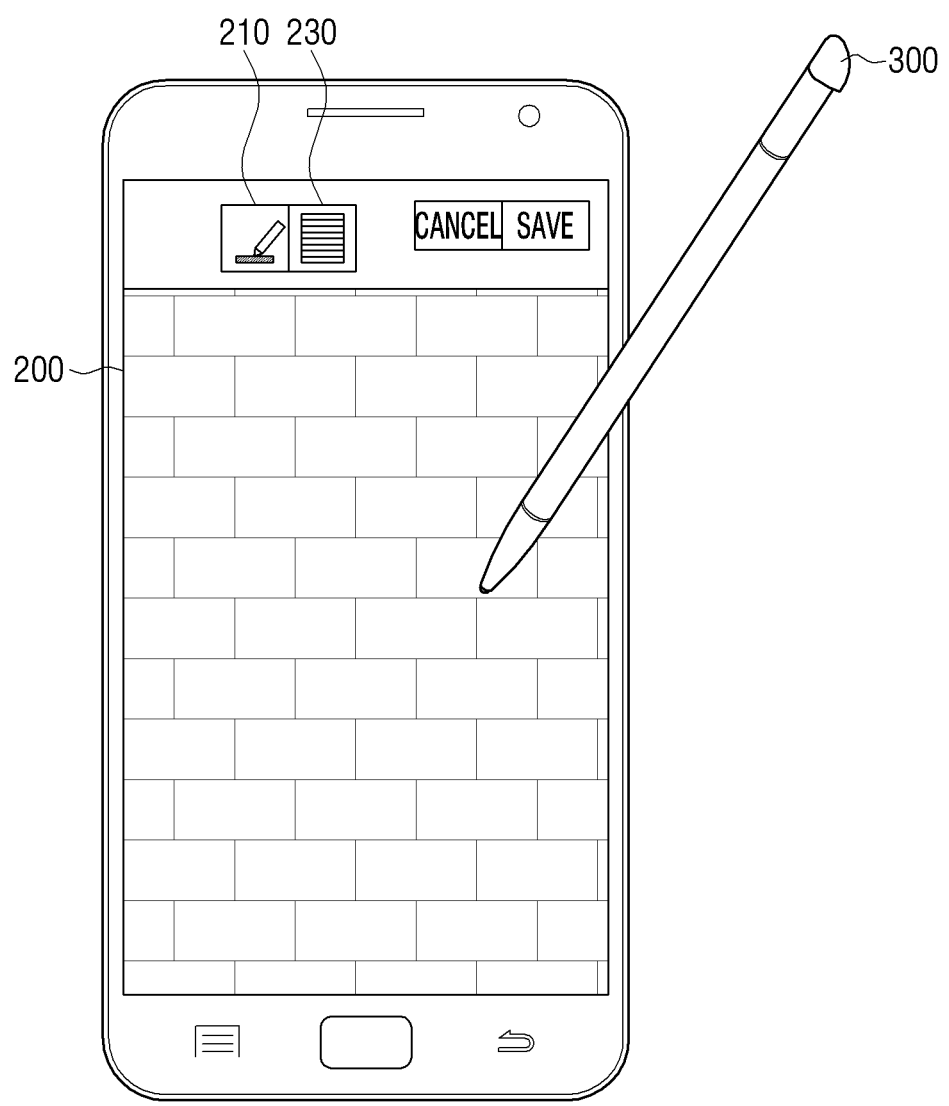

FIG. 6 is a view illustrating a notepad background image according to an exemplary embodiment.

Referring to FIG. 6, in response to a brick background image being selected as a notepad background image, a notepad in which the brick background image is applied is displayed on the user interface 110. The display apparatus 100 may change a surface friction force of the user interface 110 through the above-described electromagnetic method, and/or the polymer coating method, etc. In response to the user manipulating the pen 300 in the brick background image, the pen 300 may be led to a direction which the user does not intend when going through a crack between bricks. A surface of the user interface 110 corresponding to an area where a crack between bricks is displayed may be a form of a dent caused by contraction of a polymer according to electric current adjustment. Accordingly, the user may be provided with the experience of feeling as if he or she is writing on surface composed of bricks.

Figure 7:
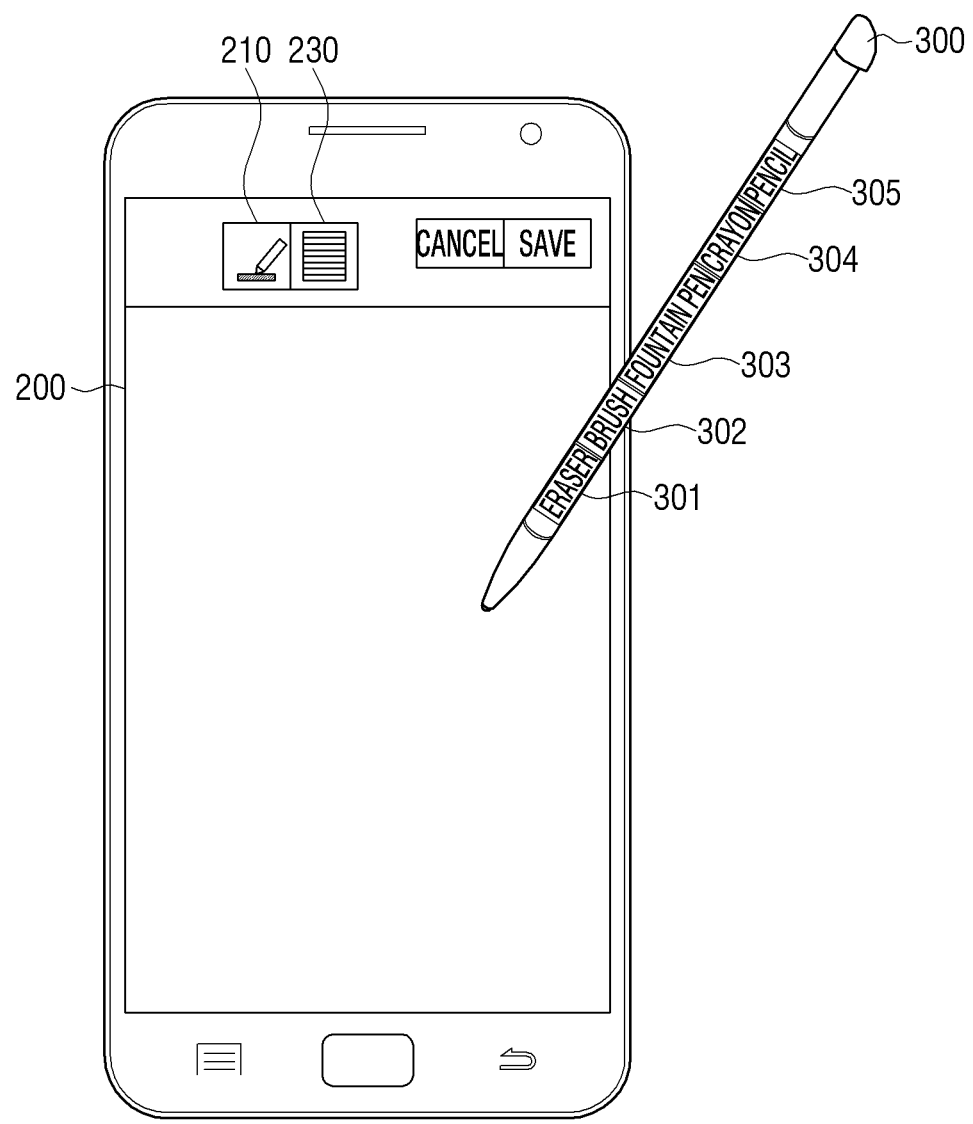

FIG. 7 is a view illustrating a pen according to an exemplary embodiment.

According to FIG. 7, a user may change an input form of a pen by selecting buttons 301 to 305 provided on the pen 300. That is, a communication interface for performing communication between the pen 300 and the display apparatus 100 may be provided on the display apparatus 100 and the pen 300. As illustrated in FIG. 7, an eraser button 301 may be disposed on a position where the user may easily adjust, and thus, the user may easily select the eraser. In the exemplary embodiment, an input form of a pen may be changed by a pen button 210 displayed on the user interface 110.

Figure 8:
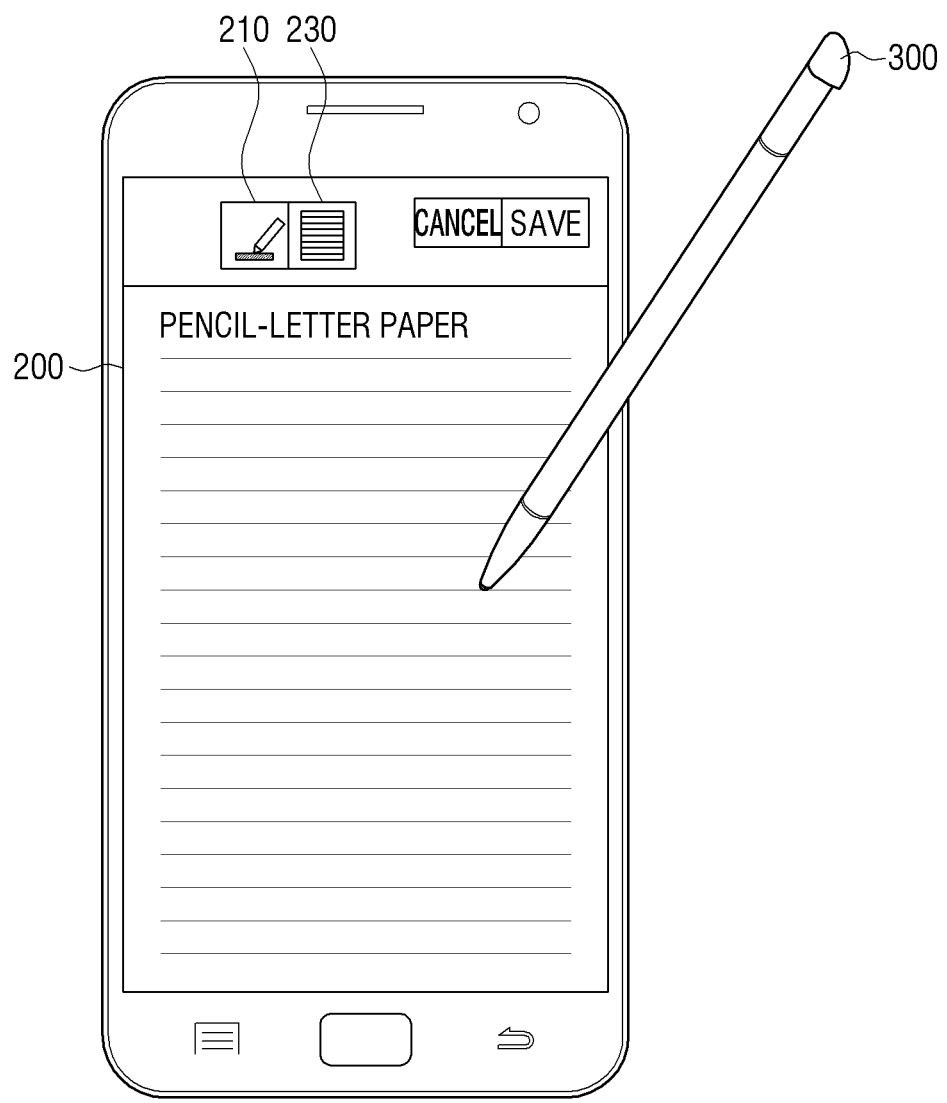

FIG. 8 is a view illustrating an operation in which a notepad background image is selected automatically according to an exemplary embodiment.

Referring to FIG. 8, in response to a user selecting a pencil, a letter paper background image is automatically applied and displayed on a notepad. In addition, a notification "pencil-letter paper" which shows the current setting state may be displayed on the upper side of the notepad. That is, a background image where the user may feel appropriate texture may be automatically selected without a separate manipulation by the user.

Figure 9:
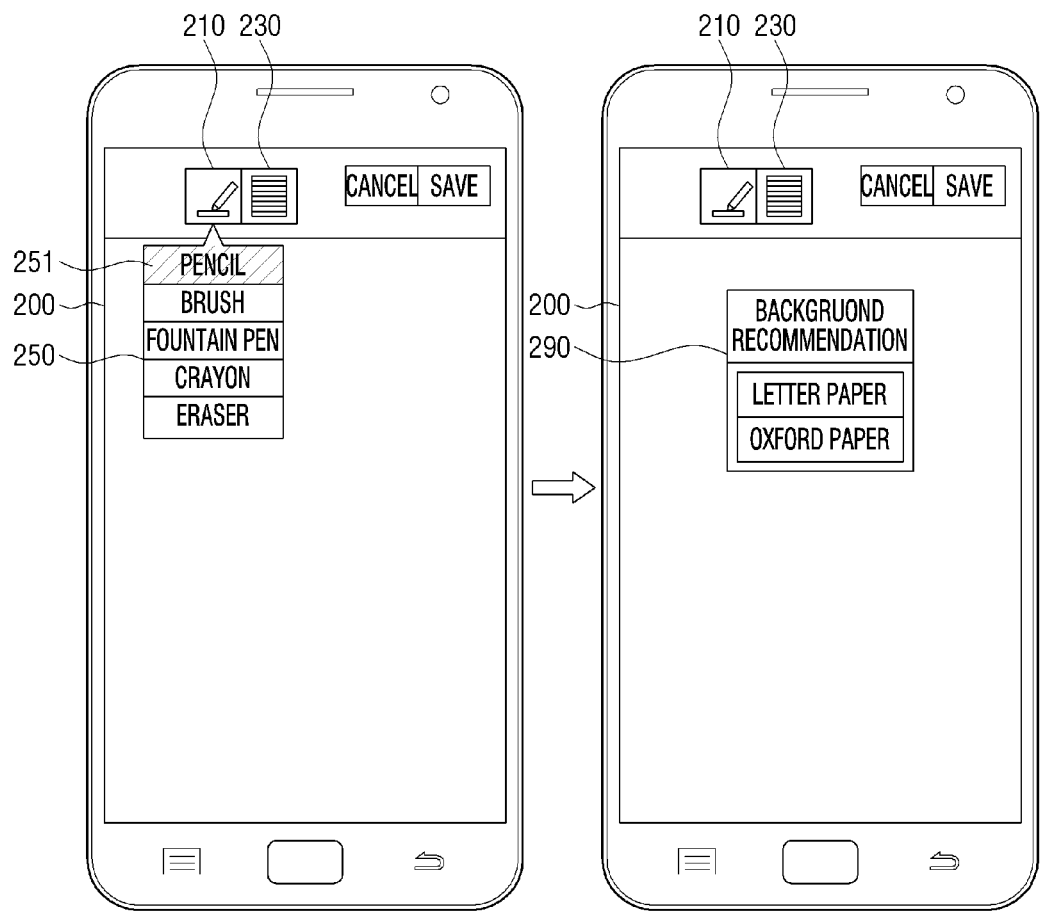
Figure 10:
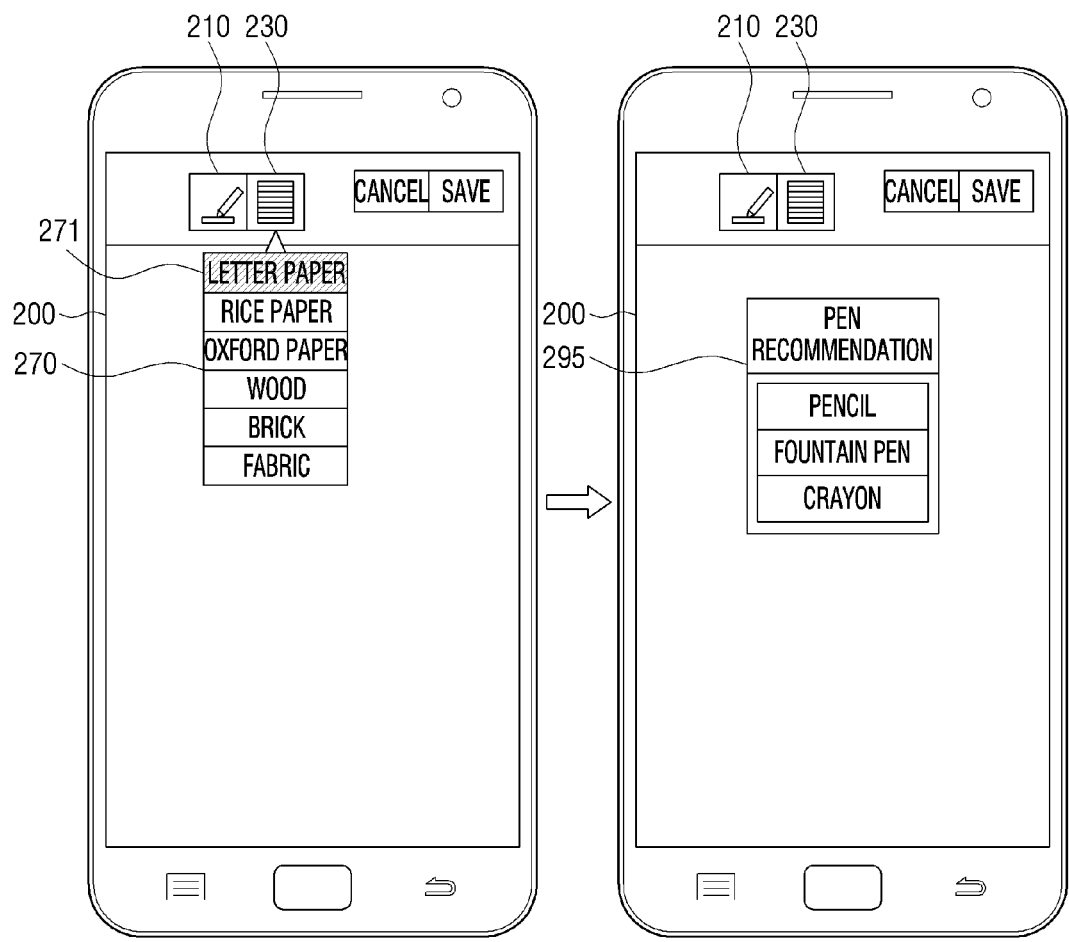

FIGS. 9 to 10 are views illustrating a recommendation list according to an exemplary embodiment.

Referring to FIG. 9, in response to a user selecting a pencil, a pencil area is marked with the selection mark 251, and a background recommendation window 290 is displayed. The background recommendation window 290 includes a list of recommended background images corresponding to the pencil. The recommendation list may be generated by predetermined settings or generated based on a history of use. Since generating a recommendation list is described above, the description of the generating will be omitted.

Referring to FIG. 10, in response to a user selecting letter paper, a letter paper area is marked with a selection mark 271 and a pen recommendation window 295 is displayed. The pen recommendation window 295 includes a list of recommended pens corresponding to the letter paper. The recommendation list may be generated by predetermined settings or generated based on a history of use. A description of generating a recommendation list is provided above, and thus, will be not be described again in detail.

Hereinabove, an operation of the display apparatus 100 by element of the display apparatus 100 was described. Hereinafter, a controlling method of the display apparatus 100 will be described with reference to a flow chart illustrated in FIG. 11.

Figure 11:
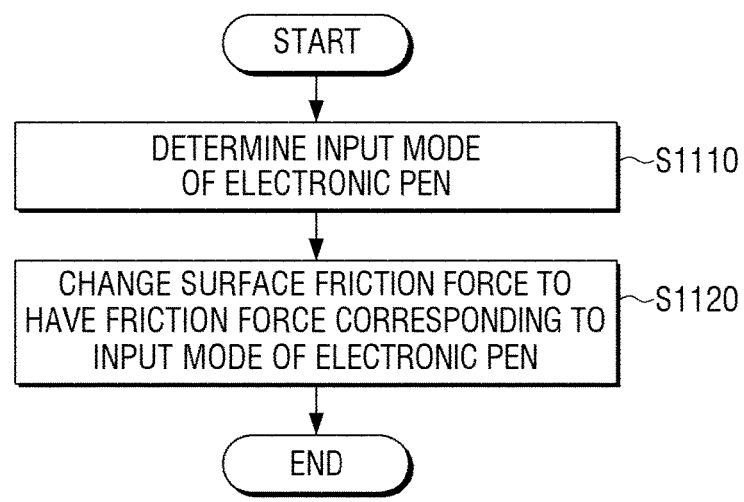
FIG. 11 is a flow chart illustrating a controlling method of a display apparatus according to an exemplary embodiment.

FIG. 11 is a flow chart illustrating a controlling method of a display apparatus according to an exemplary embodiment.

Referring to FIG. 11, an input mode of an electronic pen is determined (S1110).

A pen may operate in one of a plurality of input modes and the input mode may be embodied in various ways. For example, the input mode of a pen may be an input mode corresponding to different writing materials. Specifically, the input modes of the pen may include various modes such as a pencil mode, a brush mode, a fountain pen mode, a crayon mode, an eraser mode, etc. As set forth above, the input mode of a pen may include an input state of a pen, a type of a nib, and a type of a pen.

In addition, a surface friction force of a display surface of a display apparatus is changed to have a surface friction force corresponding to an input mode of an electronic pen (S1130). For example, in response to a pen being touched and moved on the user interface 110, a friction force may be adjusted as an electromagnetic force applied to the pen changes. In addition, the user interface 110 may be coated with a thin polymer layer which reacts to an electric current or voltage, and a surface of the coated layer may become uneven as a volume of the polymer expands or contracts according to the electric current and the voltage. Thus, a surface friction force of the user interface 110 may be adjusted through such methods.

In addition to the steps described with reference to FIG. 11, various steps described from FIGS. 1 to 10 may be added or supplemented with respect to the steps included in the exemplary embodiment illustrated in FIG. 11. Various exemplary embodiments concluded by such addition or supplement may be a controlling method of a display apparatus according to the present inventive concept. Since such various exemplary embodiments are already described above, descriptions of the exemplary embodiments will be omitted.

A controlling method of a display apparatus according to the above-described various exemplary embodiments may be coded into software and stored in a non-transitory readable medium. The non-transitory readable medium may be equipped in various apparatuses and used.

The non-transitory readable medium may include a medium which is capable of storing data semi-permanently and reading the data by an apparatus. For example, a non-transitory readable medium may include a compact disc (CD), a digital versatile disk (DVD), a hard disk, a Blu-ray disk, a universal serial bus (USB), a memory card, and a read only memory (ROM).

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a touchscreen coated with polymer having a shape which is varied by reacting to electric current or voltage, adjusts a friction force of the touchscreen, and displays a user interface (UI) for receiving a selection of any one of a background and an input mode of a pen based on a type of the pen; and
   a processor configured to, in response to the pen being touched and moved on the touchscreen, control the touchscreen to adjust the electric current or voltage based on a selected input mode of the pen,
   wherein in response to a first background being selected, the processor is further configured to control the touchscreen to display a first background image corresponding to the selected first background and to control the touchscreen to have a first friction force of the touchscreen corresponding to the first background image and the selected input mode of the pen, and
   wherein in response to a second background being selected, the processor is further configured to control the touchscreen to display a second background image corresponding to the selected second background and to control the touchscreen to set a second friction force of the touchscreen corresponding to the second background image and the selected input mode of the pen.

2. The display apparatus as claimed in claim 1, wherein in response to the pen being touched and moved on the touchscreen while a notepad is displayed on the touchscreen, the processor is further configured to control the touchscreen to display a trajectory of the pen on the notepad.

3. The display apparatus as claimed in claim 2, wherein the processor is further configured to control the touchscreen to display a recommendation list which recommends at least one background image that corresponds to the input mode of the pen among a plurality of background images.

4. The display apparatus as claimed in claim 2, wherein the pen operates in one of a plurality of input modes,
wherein the processor is further configured to control the touchscreen to display a recommendation list which recommends at least one of the plurality of input modes according to a background image of the notepad.

5. The display apparatus as claimed in claim 3, wherein in response to the at least one background image comprising at least two background images, the processor is further configured to generate the recommendation list by arranging the at least two background images in a descending order of frequency of selection with respect to the input mode of the pen.

6. The display apparatus as claimed in claim 2, further comprising:
a storage configured to store a first friction index value set based on the input mode of the pen,
a second friction index value set based on a background image of the notepad, and
information for matching the input mode and the background image, respectively.

7. The display apparatus as claimed in claim 6, wherein in response to a new input mode of the pen being generated, the processor is further configured to determine an input mode which most closely matches the new input mode by calculating proximities between a friction index value of the new input mode and friction index values pre-stored in the storage, and control the touchscreen to display a background image matched with the determined input mode by applying the background image to the notepad.

8. A method of controlling a display apparatus, comprising:
displaying a user interface (UI) for receiving a selection of any one of a background and an input mode of a pen based on a type of the pen;
determining an input mode of the pen using the received selection; and
changing a friction force of a touchscreen of the display apparatus to correspond to the determined input mode of the pen by adjusting electric current or voltage into a coated polymer of the touchscreen, a shape of the coated polymer being varied by reacting to the electric current or voltage,
the method further comprising:
in response to a first background being selected, displaying a first background image corresponding to the selected first background;
in response to the first background being selected, the changing the friction force comprises setting a first friction force of the touchscreen corresponding to the selected first background image and the determined input mode of the pen;
in response to a second background being selected, displaying a second background image corresponding to the selected second background; and
in response to the second background being selected, the changing the friction force comprises setting a second friction force of the touchscreen corresponding to the selected second background image and the determined input mode of the pen.

9. The method as claimed in claim 8, further comprising:
displaying a notepad which comprises one of a plurality of background images; and
in response to the pen being touched and moved on the touchscreen displaying the notepad, displaying a trajectory of the pen on the notepad.

10. The method as claimed in claim 9,
wherein the displaying the notepad comprises displaying the selected background image by applying the selected background image to the notepad.

11. The method as claimed in claim 9, further comprising:
displaying a recommendation list which recommends at least one background image that corresponds to the input mode of the pen among the plurality of background images.

12. The method as claimed in claim 9, further comprising:
displaying a recommendation list which recommends at least one input mode among a plurality of input modes which are supported by the pen according to a background image of the notepad.

13. The method as claimed in claim 11, wherein in response to the at least one background image comprising at least two background images, the recommendation list is a list where the at least two background images are arranged in a descending order of frequency of selection with respect to the input mode of the pen.

14. The method as claimed in claim 9, further comprising:
in response to a new input mode of the pen being generated, detecting an input mode which has a friction index value which is closest to a friction index value of the new input mode among the existing input modes; and
by applying a background image corresponding to the detected input mode to the notepad, displaying the background image corresponding to the detected input mode.

15. A display apparatus comprising:
a touchscreen coated with polymer having a shape which is varied by reacting to electric current or voltage, the touchscreen being configured to display an image and to display a user interface (UI) for receiving a selection any one of background and input mode of a pen based on a type of the pen; and
a processor configured to adjust the electric current or voltage such that a coefficient of friction of the touchscreen is changed to correspond to the displayed image,
wherein in response to a first background being selected, the processor is further configured to control the touchscreen to display a first background image corresponding to the selected first background and to control the touchscreen to have a first coefficient of friction of the touchscreen corresponding to the selected first background image and the selected input mode of the pen, and
wherein in response to a second background being selected, the processor is further configured to control the touchscreen to display a second background image corresponding to the selected second background and to control the touchscreen to set a second coefficient of friction of the touchscreen corresponding to the selected second background image and the selected input mode of the pen.

16. The display apparatus as claimed in claim 15, wherein the processor is further configured to adjust the electric current or voltage such that the coefficient of friction is changed to correspond to both of the displayed image and the selected input mode of the pen.

17. The display apparatus as claimed in claim 15, wherein the displayed image is an image of one of a plurality physical writing surfaces, and wherein the coefficient of friction is changed based on the displayed image such that a user writing on the touchscreen with the pen is provided with a feeling that mimics a feeling of writing on the physical writing surface corresponding to the displayed image.

18. The display apparatus as claimed in claim 15, wherein the shape of the polymer corresponds to a responds a roughness of the touchscreen.

19. The display apparatus as claimed in claim 1, wherein a surface of the touchscreen becomes uneven as a volume of the polymer expands or contracts according to a change in the electric current or voltage.

20. The method as claimed in claim 8, wherein a surface of the touchscreen becomes uneven as a volume of the coated polymer expands or contracts according to a change in the electric current or voltage.

\* \* \* \* \*